US010606321B2

(12) United States Patent
Wendt

(10) Patent No.: US 10,606,321 B2
(45) Date of Patent: Mar. 31, 2020

(54) SYSTEMS AND METHODS OF LATERAL TORSIONAL RESISTANCE IN A HINGE

(71) Applicant: Microsoft Technology Licensing, LLC, Redmond, WA (US)

(72) Inventor: Nicholas Benjamin Wendt, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 15/634,442

(22) Filed: Jun. 27, 2017

(65) Prior Publication Data

US 2018/0373296 A1 Dec. 27, 2018

(51) Int. Cl.
| F16M 13/00 | (2006.01) |
| G06F 1/16 | (2006.01) |
| E05D 11/08 | (2006.01) |
| E05D 11/06 | (2006.01) |
| E05D 3/12 | (2006.01) |
| F16C 11/04 | (2006.01) |
| E05D 3/06 | (2006.01) |
| E05D 3/02 | (2006.01) |

(52) U.S. Cl.
CPC ............. *G06F 1/1681* (2013.01); *E05D 3/06* (2013.01); *E05D 3/122* (2013.01); *E05D 11/06* (2013.01); *E05D 11/082* (2013.01); *F16C 11/04* (2013.01); *G06F 1/1626* (2013.01); *E05D 3/02* (2013.01); *E05Y 2900/606* (2013.01)

(58) Field of Classification Search
CPC ..... F16M 11/10; F16M 11/2021; F16M 11/38
USPC ..... 248/291.1, 292.12, 292.14, 284.1, 286.1, 248/288.11
See application file for complete search history.

(56) References Cited

U.S. PATENT DOCUMENTS

| 5,882,061 | A | * | 3/1999 | Guillouet | ............. | B60N 2/1615 248/421 |
| 6,392,877 | B1 | | 5/2002 | Iredale | | |
| 6,572,065 | B2 | * | 6/2003 | Koga | ..................... | B60N 2/067 248/421 |
| 6,926,546 | B2 | | 8/2005 | Kurokawa | | |
| 7,124,984 | B2 | | 10/2006 | Yokouchi et al. | | |
| 7,458,546 | B2 | | 12/2008 | Jang | | |
| 7,699,275 | B2 | | 4/2010 | Jang | | |
| 8,307,507 | B2 | * | 11/2012 | Wang | ..................... | E05D 11/06 16/334 |

(Continued)

FOREIGN PATENT DOCUMENTS

EP 2626766 A2 8/2013

OTHER PUBLICATIONS

"International Search Report and Written Opinion Issued in PCT Application No. PCT/US2018/034262", dated Aug. 8, 2018, 11 Pages.

*Primary Examiner* — Steven M Marsh
(74) *Attorney, Agent, or Firm* — Ray Quinney & Nebeker P.C.; John O. Carpenter

(57) ABSTRACT

A hinge includes a frame, an arm, a torque element, and a link. The frame and arm are rotatably connected about a first lateral axis. The torque element is displaced from the first lateral axis in a longitudinal direction perpendicular to the first lateral axis, and the torque element being rotatable about a second lateral axis. The link is connected to the arm and the torque element such that rotation of the arm about the first lateral axis translates the torque element in the longitudinal direction.

19 Claims, 7 Drawing Sheets

(56) References Cited

U.S. PATENT DOCUMENTS

| | | |
|---|---|---|
| 8,807,507 B2 * | 8/2014 | Ito .................. B60N 2/1615 |
| | | 248/421 |
| 9,501,108 B2 | 11/2016 | Lee et al. |
| 9,549,479 B2 | 1/2017 | Gault et al. |
| 9,557,776 B1 | 1/2017 | Oakeson |
| 9,683,693 B2 * | 6/2017 | Yu .................. F16M 13/005 |
| 2009/0159768 A1 * | 6/2009 | Oh .................. F16M 11/10 |
| | | 248/284.1 |
| 2016/0320811 A1 | 11/2016 | Lin |
| 2017/0139446 A1 | 5/2017 | Lan et al. |

\* cited by examiner

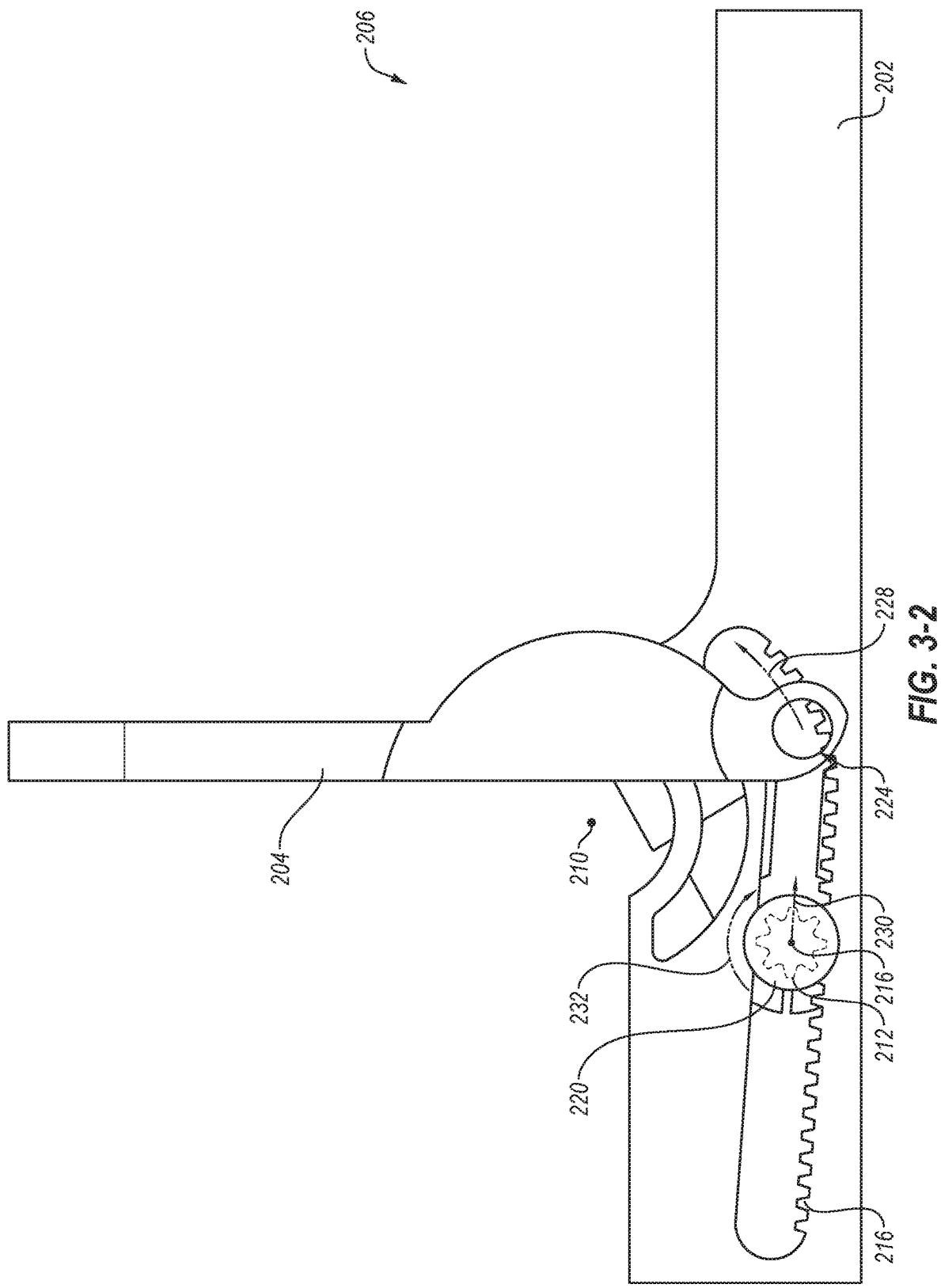

SYSTEMS AND METHODS OF LATERAL TORSIONAL RESISTANCE IN A HINGE

CROSS-REFERENCE TO RELATED APPLICATIONS

N/A

BACKGROUND

Use of computing devices is becoming more ubiquitous by the day. Computing devices range from standard desktop computers to wearable computing technology and beyond. One area of computing devices that has grown in recent years is the hybrid and tablet computers. Many hybrid computers include input devices that may be separated from the screen. When separated from the other components, the screen may function as a table computer.

Conventional laptop computers may have a hinge between the screen and the keyboard portions of the laptop computer that supports the screen at a variety of angles between a closed position and an open position. Conventional tablet computers lack a support to hold the tablet in an upright or angled positioned. Tablet computers that include a support to hold the tablet increase a thickness of the tablet to package a hinge into the frame of the tablet computer that provides sufficient strength to support the tablet computer in a variety of intermediate positions.

SUMMARY

In some embodiments, a hinge includes a frame, an arm, a torque element, and a link. The frame and arm are rotatably connected about a first lateral axis. The torque element is displaced from the first lateral axis in a longitudinal direction perpendicular to the first lateral axis, and the torque element being rotatable about a second lateral axis. The link is connected to the arm and the torque element such that rotation of the arm about the first lateral axis translates the torque element in the longitudinal direction.

In other embodiments, a hinge includes a frame, an arm, and a torque element. The frame and arm are rotatably connected about a first lateral axis. The torque element has an axis of rotation at a second lateral axis that is parallel to and displaced from the first lateral axis. The arm has an open position, an intermediate position, and a closed position and the torque element does more work when the arm moves between the open position and the intermediate position than between the intermediate position and the closed position.

In yet other embodiments, a method of applying torque in a hinge includes rotating an arm about a first lateral axis and moving a link connected to the arm. The method further includes translating a torque element in a longitudinal direction along a track. The method then includes rotating the torque element about a second lateral axis by an interaction of the torque element and the track, and resisting the rotation of the torque element about the second lateral axis.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2-1 is a detail view of an implementation of a hinge of the electronic device of FIG. 1 in a closed position;

FIG. 2-2 is a detail view of an implementation of a hinge of the electronic device of FIG. 1 in an open position;

FIG. 3-1 is a side cross-sectional view of another implementation of a hinge in a closed position;

FIG. 3-2 is a side cross-sectional view of the implementation of a hinge of FIG. 3-1 in an intermediate position;

FIG. 3-3 is a side cross-sectional view of the implementation of a hinge of FIG. 3-1 in an open position;

DETAILED DESCRIPTION

This disclosure generally relates to devices, systems, and methods for providing a rotatable joint between two structures. More particularly, the present disclosure relates to providing a hinge with varying resistance between a closed position and an open position. In some implementations, the hinge may allow the movement of a support arm in an electronic device. The support arm and hinge may have sufficient strength to support the electronic device at any angle of the support arm between the closed position and the open position while remaining movable by a user without the aid of tools.

In some implementations, a hinge may have an increased rotational resistance, a smaller overall thickness, a more progressive resistance curve, or combinations thereof relative to conventional hinges. For example, an implementation of a hinge described herein may include a longitudinally displaced frictional element that allows a smaller thickness than a conventional hinge. In other examples, an implementation of a hinge described herein may include different resistance regions depending on the rotational position of the hinge. In yet other examples, an implementation of a hinge described herein may include a camming mechanism to progressively alter the resistance of the hinge. In yet other examples, an implementation of a hinge described herein may have a combination of the foregoing to provide an approximately linear resistance curve as the hinge rotates.

Figure 1:
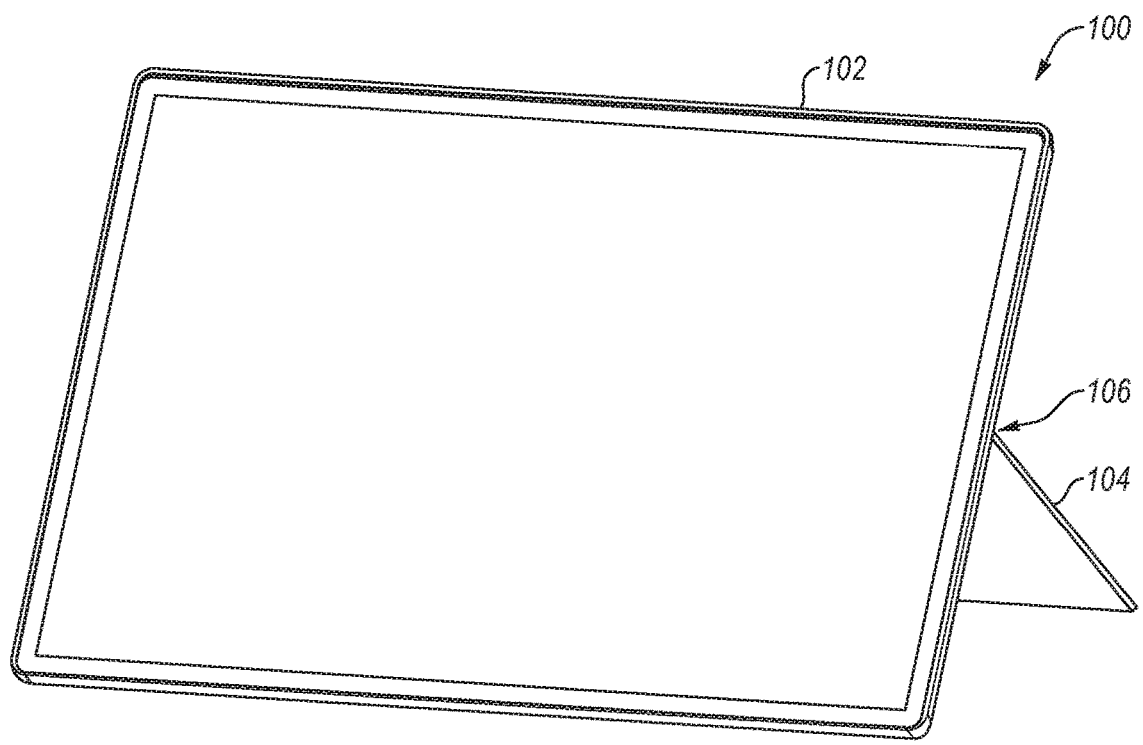
FIG. 1 is a perspective view of an implementation of an electronic device with a support arm.

FIG. 1 is a perspective view of an implementation of an electronic device 100. While the present disclosure will describe hinges in relation to a tablet and/or hybrid computer, it should be understood that various implementations of hinges described herein may be applicable to other electronic devices, such as digital picture frames, cellular telephones (i.e., smartphones), video game consoles, videoconferencing displays, electronic readers, or other electronic devices with displays. An electronic device 100 may include a frame 102. The frame 102 may be rotatably connected to a support arm 104 about a hinge 106. The hinge 106 may allow the support arm 104 to move continuously between a closed position and an open position and support the frame 102 at a continuous range of angles relative to a surface on which the electronic device 100 rests.

In conventional electronic devices with hinged support arms, the amount of force required to move the support arm 104 may be substantially constant throughout the range of movement. However, the amount of torque from the hinge 106 needed to support the electronic device 100 when the support arm 104 is positioned at a smaller angle (i.e., the hinge 106 is closer to the closed position and the electronic device 100 is nearly upright) may be less than the amount of torque needed to support the electronic device 100 when the support arm 104 is positioned at a larger angle (i.e., the hinge 106 is closer to the open position and the electronic device 100 is nearly flat). Example implementations of hinge 106 may vary the torque of the hinge relative to the position of the hinge.

Figures 1, 2:
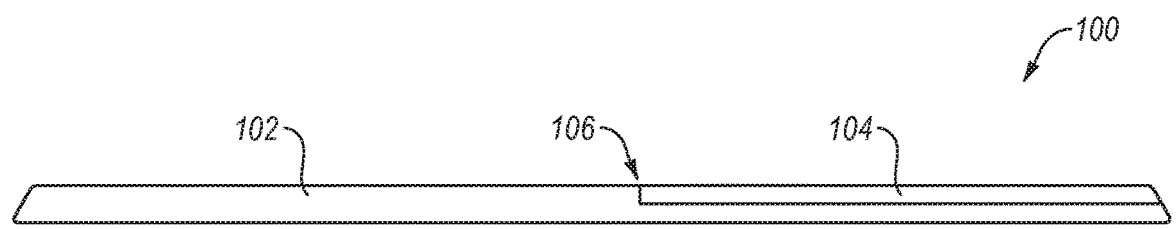
Figure 2:
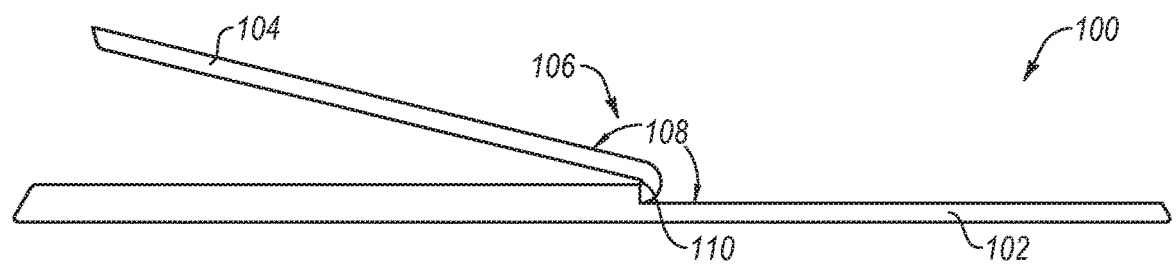

FIGS. 2-1 and 2-2 illustrate the range of movement of the implementation of a hinge 106 of FIG. 1. FIG. 2-1 is a side view of the electronic device 100 with the hinge 106 in a closed position. In the closed position, the hinge 106 allows the support arm 104 to lie parallel and/or flush with the frame 102. The hinge 106 may be continuously movable between the closed position illustrated in FIG. 2-1 and the open position illustrated in FIG. 2-2. FIG. 2-2 is a side view of the implementation of an electronic device 100 of FIG. 2-1 with a support arm 104 and hinge 106 in an open position.

In some implementations, an angle 108 of the hinge 106 (e.g., the angle between the frame 102 and the support arm 104) in the open position may be at least 165 degrees. The hinge 106 may be selectively positioned at any angle 108 between 0 degrees and 165 degrees and the hinge 106 may resist movement from that position. The hinge 106 may be rotatable about a lateral axis 110 of the hinge 106. In some implementations, the lateral axis 110 may be a physical axle (e.g., rod, pin, post) about which the hinge 106 rotates. In other implementations, the lateral axis 110 may be a virtual axle about which a plurality of telescoping components may move.

In some implementations, a lateral axis 110 with a virtual axle may allow for a smaller vertical height of the hinge 106 in a closed position. For example, a vertical height of the hinge 106 may be in a range having an upper value, a lower value, or upper and lower values including 2.0 millimeters (mm), 2.2 mm, 2.4 mm, 2.6 mm, 2.8 mm, 3.0 mm, 3.2 mm, 3.4 mm, 3.6 mm, 3.8 mm, 4.0 mm, or any values therebetween. In some examples, the vertical height in the closed position may be less than 4.0 mm. In other examples, the vertical height in the closed position may be less than 3.5 mm. In yet other examples, the vertical height in the closed position may be less than 3.0 mm.

Figures 1, 3:
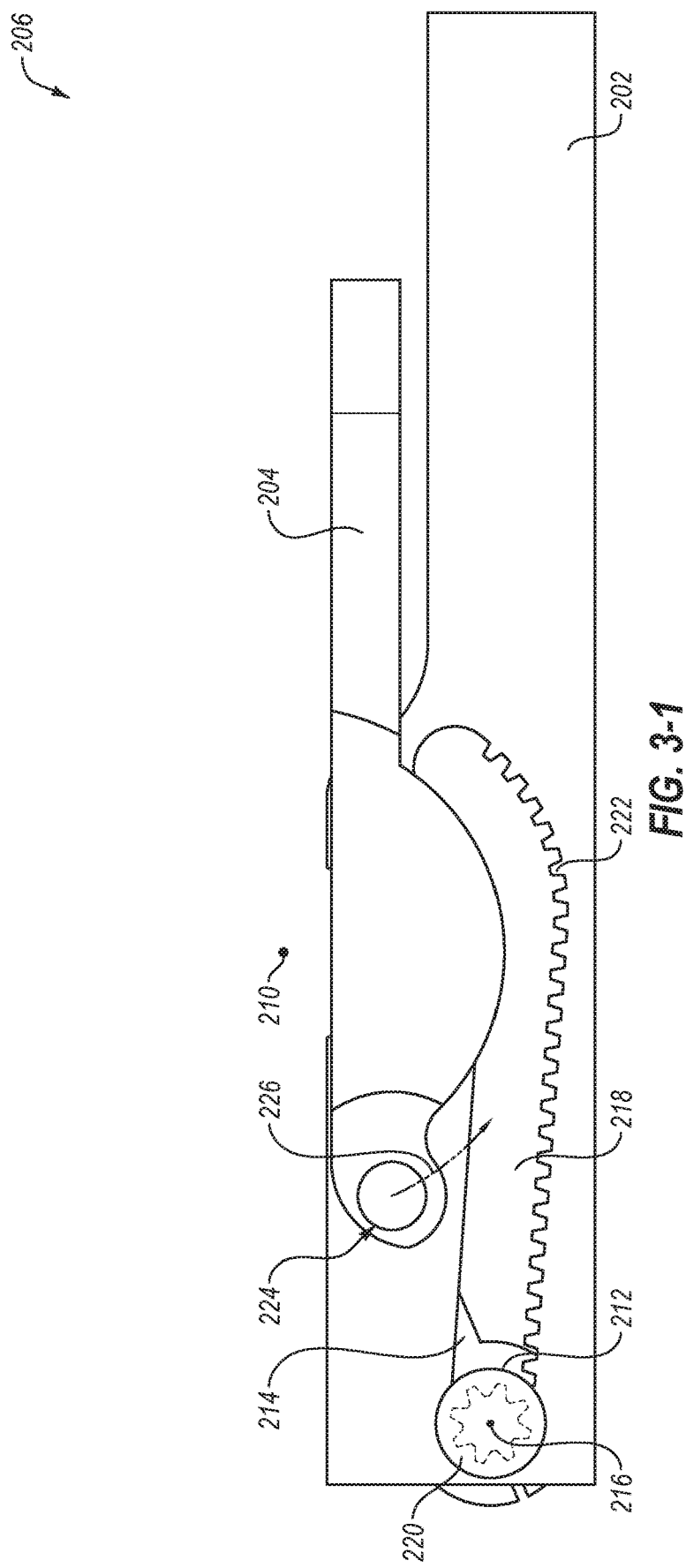
Figure 3:
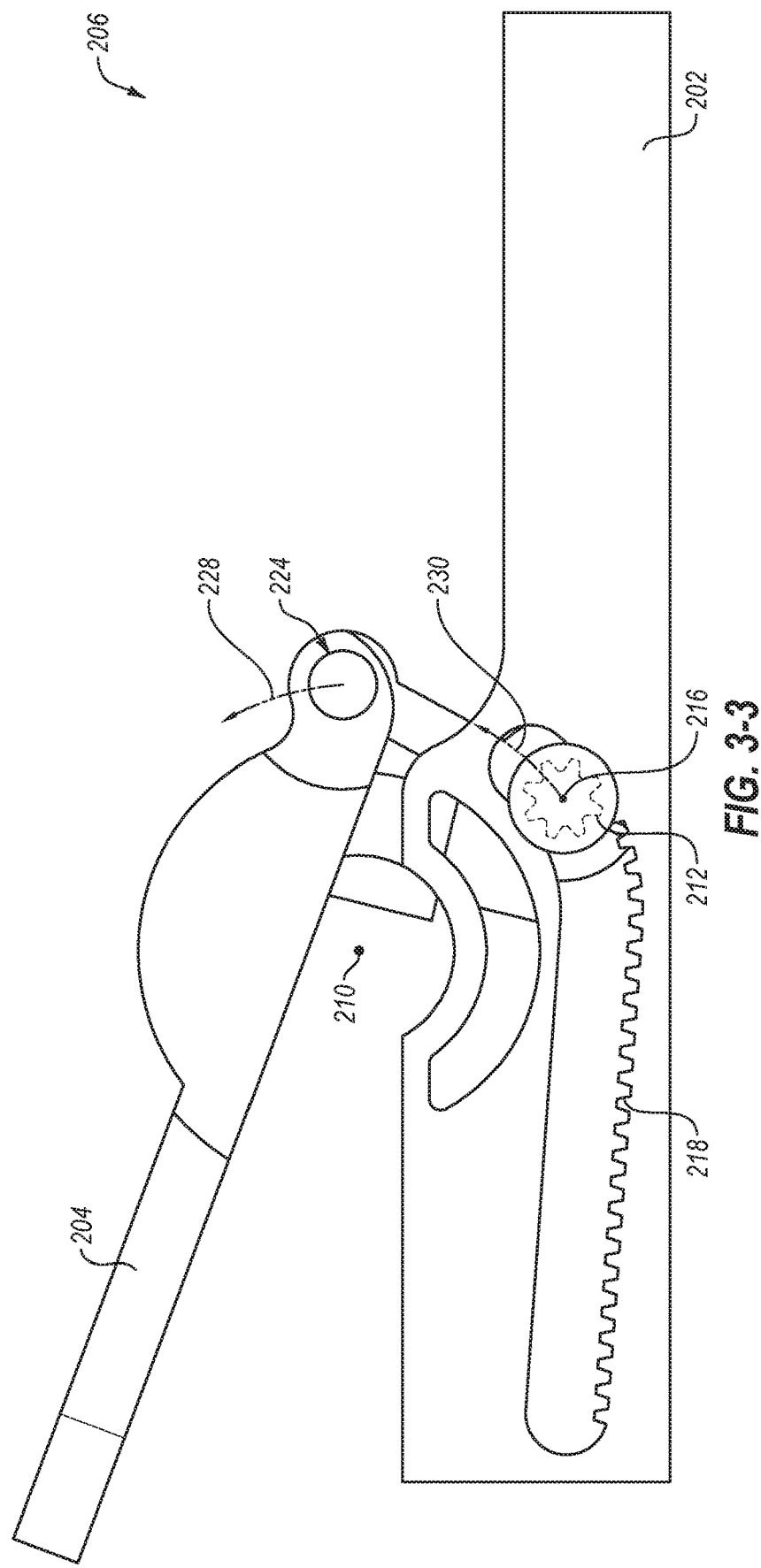

FIG. 3-1 through FIG. 3-3 illustrate an implementation of a hinge 206 with telescoping components and a progressive resistance as the hinge 206 moves between a closed position to an open position. FIG. 3-1 is a side view of an implementation of a hinge 206. The hinge 206 may connect a frame 202 with an arm 204. In some implementations, the frame 202 may be the frame of an electronic device, such as the frame 102 of the electronic device 100 of FIG. 1. In other implementations, the frame 202 may be affixed to the frame of an electronic device. In some implementations, the arm 204 may be the support arm of an electronic device, such as the support arm 104 of the electronic device of FIG. 1. In other implementations, the arm 204 may be affixed to the support arm of an electronic device. In at least one implementation, the hinge 206 may be inverted and the frame 202 may be connected to a support arm of an electronic device and the arm 204 may be connected to a frame of an electronic device.

The arm 204 may rotate relative to the frame 202 about a first lateral axis 210. To provide resistance to the movement of the arm 204, the hinge 206 may include a torque element 212 displaced in a longitudinal direction from the first lateral axis 210 and connected to the arm 204 with a link 214. In some implementations, the torque element 212 may include a first portion that rotates relative to a second portion about a second lateral axis 216. The torque element 212 may have a predetermined amount of friction between the first portion and second portion, such that the torque element 212 resists rotation of the first portion relative to the second portion. In at least one example, the first portion may be fixed relative to part of the link 214.

In some implementations, frame 202 may include a track 218. The track 218 may at least partially limit the movement of the torque element 212 relative to the frame 202 and/or arm 204. For example, the track 218 may limit and/or prevent the movement of the torque element 212 in the lateral direction and allow movement of the torque element 212 in the longitudinal direction and/or vertical direction. In some implementations, the torque element 212 may be positioned in the track 218 and configured to interlock with at least a portion of the track 218. The example implementation of torque element 212 illustrated in FIG. 3-1 includes a plurality of first teeth 220 and the track 218 includes a plurality of complimentary teeth 222, which may mechanically interlock with the teeth 220 of the torque element 212. The track 218 may have complimentary teeth 222 on a single side of the track 218, allowing the teeth 220 of the torque element to slide relative to the track 218 opposite the complimentary teeth 222.

The mechanical interlock of the torque element 212 and the track 218 may, thereby, require the rotation of the torque element 212 about the second lateral axis 216 during linear translation of the torque element 212 relative to the track 218, and hence frame 202. In some implementations, the friction of the torque element 212 resisting a rotation of the torque element 212 may, thereby, cause the torque element 212 to resist the linear translation of the torque element 212 in the track 218. Additionally, a rotation of the arm 204 about the first lateral axis 210 may move the link 214, which may translate the torque element 212. The friction of the rotation of the torque element 212 as the torque element 212 translates along the track 218, may resist the translation of the link 214 and, therefore, the rotation of the arm 204 about the first lateral axis 210.

In some implementations, the conversion of the rotational movement of the arm 204 about the first lateral axis 210 to a substantially linear movement of the torque element 212 along the track 218 may allow for a progressive change in resistance. For example, the arm 204 may include a lobe 224 that is rotationally connected to the link 214. An initial rotational movement of the arm 204 about the first lateral axis 210 may displace the lobe 224 in an initial direction 226 substantially perpendicular to the link 214. The perpendicular movement of the lobe 224 in the initial direction 226 may produce little or no linear translation of the link 214 and/or torque element 212. With little linear translation of the torque element 212 relative to the track 218, the torque element 212 may provide little to no resistance to the movement of the lobe 224 in the initial direction 226.

In some implementations, the camming action of the arm 204 described herein may allow the arm 204 to rotate about the first lateral axis 210 up to 1 degree, 2 degrees, 3 degrees, 4 degrees, 5 degrees, 6 degrees, 8 degrees, or 10 degrees without resistance from the torque element 212. The camming action of the lobe 224 and the link 214 may increase toward an intermediate position of the arm 204. FIG. 3-2 illustrates the hinge 206 in an intermediate position between the closed position of FIG. 3-1 and the open position of FIG. 3-3.

The rotation of the arm 204 about the first lateral axis 210 may continue to pull the link 214 and, in turn, translate the torque element 212 along the track 218. As the teeth 220 of the torque element 212 engage with the complimentary teeth 222 of the track 218, the torque element 212 may provide increased resistance as the torque element 212 moves more rapidly along the track 218. The relative linear translation speed 230 of the torque element 212 relative to the arm speed 228 of the lobe 224 may increase as the arm 204 moves towards the depicted intermediate position. In other words, assuming a constant arm speed 228, the camming action of the lobe 224 and the link 214 may cause the linear translation speed 230 of the torque element 212 to increase towards the intermediate position. Because the linear translation speed 230 of the torque element 212 increases toward the intermediate position, the torque element rotational rate 232 increases. As the torque element rotational rate 232 increases per degree of rotation of the arm 204, the amount of resistance provided by the torque element 212 per degree of rotation of the arm 204 increases.

Finally, FIG. 3-3 is a side cross-sectional view of the hinge 206 in a third movement regime with constant resistance provided by the torque element 212. As the arm 204 moves past the intermediate position toward the depicted open position, the track 218 may curve. The curved portion of the track 218 may approximate the arcuate movement of the lobe 224 and arm 204. During the curved portion of the track 218, the arm speed 228 and/or linear translation speed 230 of the lobe 224, link 214, and torque element 212 around the first lateral axis 210 may be substantially equal. The resistance provided by the torque element 212 may, therefore, be substantially constant per degree of rotation of the arm 204.

In some implementations, the resistance of hinge 206 illustrated in FIG. 3-1 through FIG. 3-3 may be adjusted by changing the gearing ratio of the torque element 212 and the track 218. For example, the present example of a hinge 206 in FIG. 3-1 through FIG. 3-3 converts 165 degrees of rotation of the arm 204 about the first lateral axis 210 to a linear motion of the torque element 212 and then to approximately 720 degrees of rotation of the torque element 212 about the second lateral axis 216, resulting in a gearing ratio (rotation of the torque element 212 about the second lateral axis 216 to rotation of the arm 204 about the first lateral axis 210) of about 4.5. In other implementations, the gearing ratio may be in a range having an upper value, a lower value, or upper and lower values including any of 1.0, 1.5, 2.0, 2.5, 3.0, 3.5, 4.0, 4.5, 5.0, 5.5, 6.0, 6.5, 7.0, 7.5, 8.0, or any values therebetween. For example, the gearing ratio may be greater than 1.0. In other examples, the gearing ratio may be less than 8.0. In yet other examples, the gearing ratio may be between 1.0 and 8.0. In further examples, the gearing ratio may be between 2.0 and 7.0. In yet further examples, the gearing ratio may be between 3.0 and 6.0.

In other implementations, the resistance of a hinge 206 may be altered by altering the friction of the torque element. For example, a torque element with increased resistance per degree of rotation about the rotational axis of the torque element will increase the work done as the hinge moves. For example, a hinge may produce similar resistance with a torque element that generates half the friction if the gearing ratio is doubled. In yet other implementations, hinge 206 may alter the gearing ratio and/or resistance of the torque element depending on the position of the hinge at or between the closed position and open position.

Figure 4:
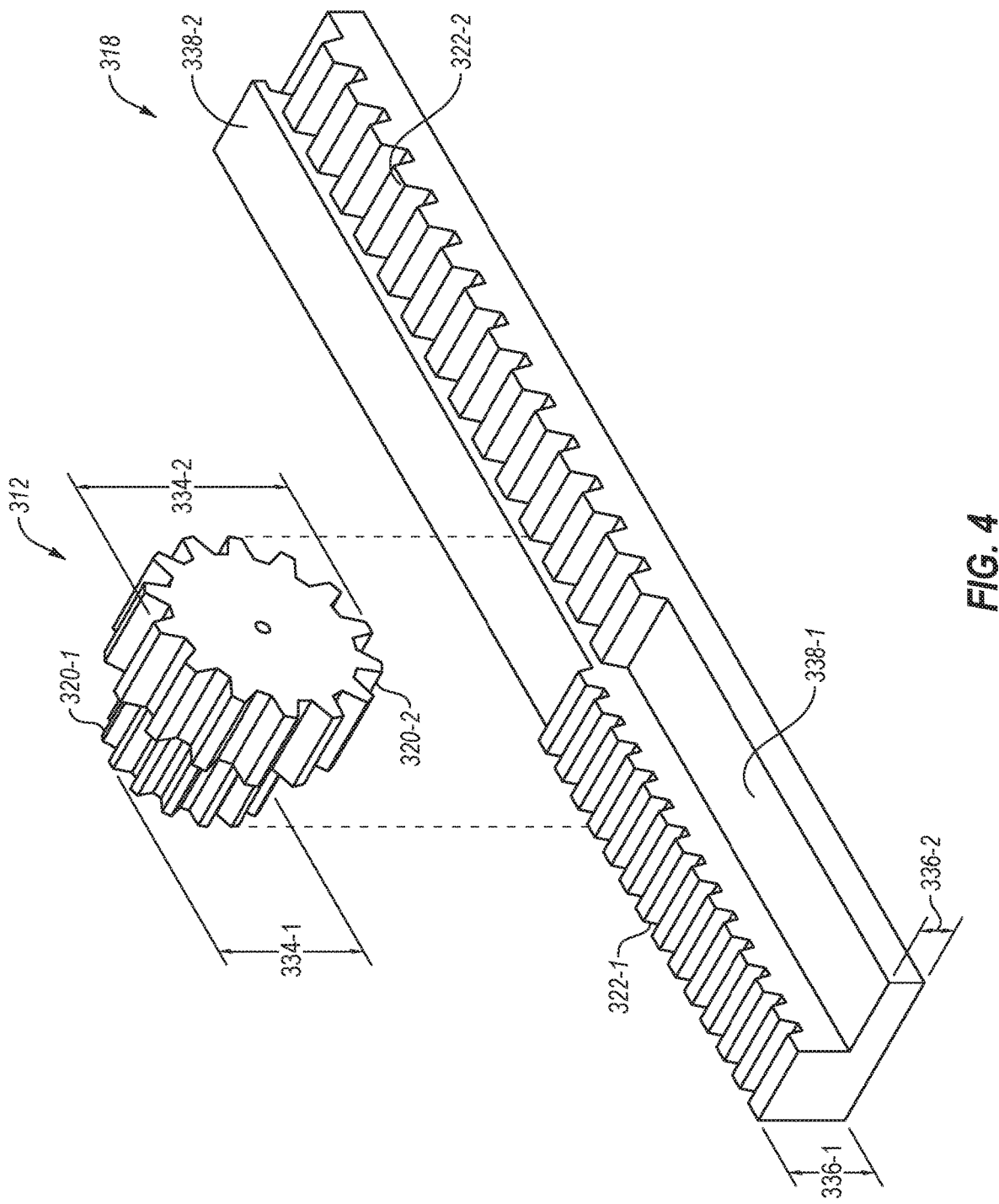
FIG. 4 is a perspective view of an implementation of a torque element and track having multiple gearing ratios.

FIG. 4 is an exploded perspective view of an implementation of a track 318 and a torque element 312 with two different gearing ratios depending on the longitudinal position of the torque element 312 in the track 318. In some implementations, the torque element 312 may have a plurality of sets of teeth 320-1, 320-2. For example, the first set of teeth 320-1 and second set of teeth 320-2 may be laterally offset from one another. The first set of teeth 320-1 may have a first diameter 334-1 and the second set of teeth 320-2 may have a second diameter 334-2. The difference between the first diameter 334-1 and the second diameter 334-2 may change the gearing ratio of a hinge by changing the circumference of the torque element 312 and, therefore, the amount of rotation of the torque element 312 during linear translation on the track 318.

A diameter ratio (i.e., the first diameter 334-1 to the second diameter 334-2) may be in a range including an upper value, a lower value, or upper and lower values including any of 0.1, 0.2, 0.3, 0.4, 0.5, 0.6, 0.7, 0.8, 0.9, 0.95, 0.99, or any values therebetween. For example, the diameter ratio may be greater than 0.1. In other examples, the diameter ratio may be less than 0.99. In yet other examples, the diameter ratio may be between 0.1 and 0.99. In further examples, the diameter ratio may be between 0.2 and 0.9. In yet further examples, the diameter ratio may be between 0.5 and 0.8.

The track 318 may have laterally offset sets of complimentary teeth 322-1, 322-2 that may engage with the torque element 312. A first set of complimentary teeth 322-1 may be positioned at a first height 336-1 that is greater than a second height 336-2 of a second set of complimentary teeth 322-2. The first height 336-1 and second height 336-2 may have a difference equal to the different in radii of the torque element 312 (i.e., one half the first diameter 334-1 and one half the second diameter 334-2).

In some implementations, the track 318 may be recessed or smooth in the regions without the sets of complimentary teeth 332-1, 332-2 to allow the rotation of the torque element 312 to be related to only one pair of the teeth and complimentary teeth at a time. For example, the second set of teeth 320-2 may move freely adjacent a first smooth region 338-1 of the track when the first set of teeth 320-1 and first set of complimentary teeth 322-1 are engaged. As the torque element 312 translated in a longitudinal direction, the second set of teeth 320-2 and second set of complimentary teeth 320-2 may engage, and the first set of teeth 320-1 may disengage from the first set of complimentary teeth 322-1. The first set of teeth 320-1 may then move freely on the second smooth region 338-2 of the track 318. While FIG. 4 illustrates an implementation of a track 318 and torque element 312 with two gearing ratios, in other implementations, a hinge may have a track and torque element with three, four, five, six, or more gearing ratios.

In addition to varying a gearing ratio, a hinge in an example implementation may vary the friction of the torque element. For example, the hinge may include a plurality of torque elements configured to rotate independently from one another that provide different frictional forces. The hinge may include more than one track, such as shown in FIG. 4, that allows for different torque elements to be engaged at different longitudinal positions. Therefore, even with the same gearing ratio, the different torque elements may provide different amounts of work.

Figure 5:
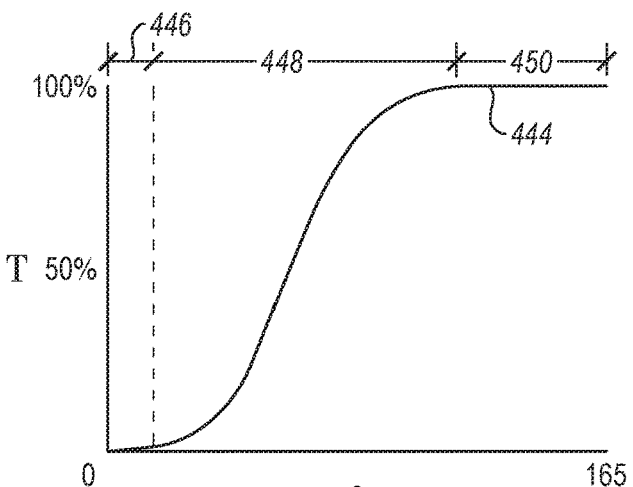
FIG. 5 is a torque curve of an implementation of a hinge with a camming action and a partially curved track.
Figure 6:
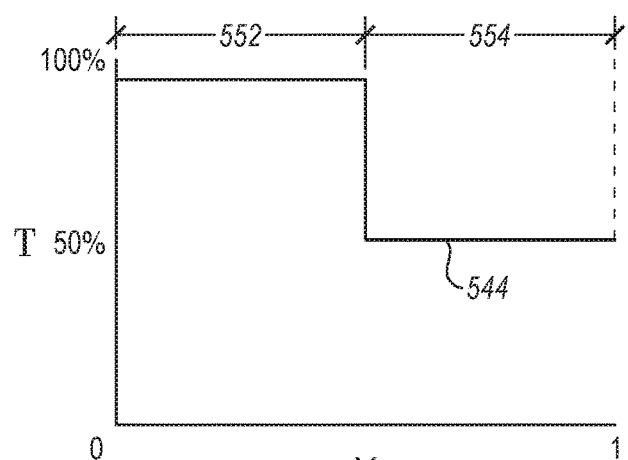
FIG. 6 is a torque curve of an implementation of a torque element and track having different gearing ratios.
Figure 7:
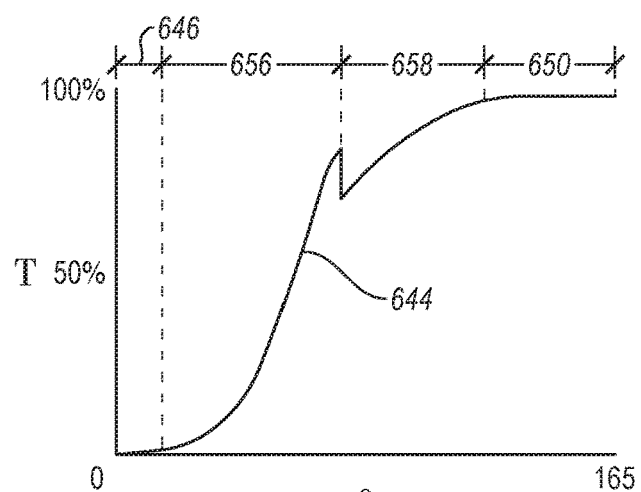
FIG. 7 is a torque curve of an implementation of a hinge with a camming action and a partially curved track as well as different gearing ratios.

FIG. 5 through FIG. 7 are graphs illustrating torque curves (normalized to the maximum torque) of implementations of hinges described herein. FIG. 5 is a torque curve 444 approximating the resistance of a hinge with a camming action and a curved track such as the hinge 206 described in relation to FIG. 3-1 through FIG. 3-3. In some implementations, the hinge may apply little to no torque in an initial movement region 446 as the arm rotates with little to no translation of the torque element. The initial movement region 446 may be from 0 degrees (the closed position) up to 1 degree, 2 degrees, 5 degrees, 10 degrees, or any values therebetween.

As the camming action of the lobe and link accelerates the linear translation of the torque element relative to a track, the torque may increase through an intermediate movement region 448 to the intermediate position of the arm. The torque curve 444 may have a stable portion at the curved movement region 450 after the intermediate position of the arm when the movement of the arm and the linear translation of the torque element establish a 1:1 relationship.

In some implementations, the torque element may do more work between the intermediate position and the open position (i.e., in the curved movement region 450) than between the closed position and the intermediate position (i.e., in the initial movement region 446 and the intermediate movement region 448). In other implementations, the torque element may do less work between the intermediate position and the open position than between the closed position and the intermediate position. In yet other implementations, a torque element may do the same amount of work between the intermediate position and the open position and between the closed position and the intermediate position.

FIG. 6 is another implementation of a torque curve 544 approximating the torque generated by a dual gearing ratio torque element and track during linear translation of the torque element on the track, such as described in relation to FIG. 4. FIG. 4 illustrates the linear translation, but the linear translation may be affected by the camming action and/or curvature of the track. FIG. 4 illustrates the torque curve assuming constant linear translation. The torque element may have a constant friction associated with resisting rotation, but the dual gearing ratio of the torque element and track may produce a first torque region 552 and a second torque region 554. In some implementations, a transition from the first torque region 552 to the second torque region 554 may be discontinuous as the first teeth or the torque element and the first complimentary teeth of the track disengage and the second teeth or the torque element and the second complimentary teeth of the track engage, or vice versa. In other implementations, additional gearing ratios may reduce the change in the discontinuity, providing a more continuous feeling to a user of the hinge. An implementation of a hinge having different friction regimes for the torque element may experience discontinuities in a torque curve similar to that illustrated in FIG. 6.

In some implementations, a hinge such as described in relation to FIG. 3-1 through 3-3 may include a torque element and track such as that described in relation to FIG. 4. For example, FIG. 7 illustrates a torque curve 644 for a combined hinge. A hinge may include a higher gearing ratio near the closed position when the rotation of the arm and the linear translation of the torque element are more disparate and a lower gearing ratio near the open position when the rotation of the arm and the linear translation of the torque element are more similar. The higher gearing ratio may produce an increase in resistance to the movement of the arm immediately after the initial movement region 646 to produce higher torque near the closed position and lower torque near the open position.

In some implementations, the intermediate movement region may be divided by the discontinuous change in the gearing ratio into a first intermediate movement region 656 and a second intermediate movement region 658. The torque curve 644 may attain a maximum and constant force during the curved movement region 650, similarly to the torque curve 444 described in relation to FIG. 5. By altering the gearing ratio (or friction) of the torque element and track in the intermediate movement region, a hinge may reduce the difference in torque between the first intermediate movement region 656 and second intermediate movement region 658.

Figure 8:
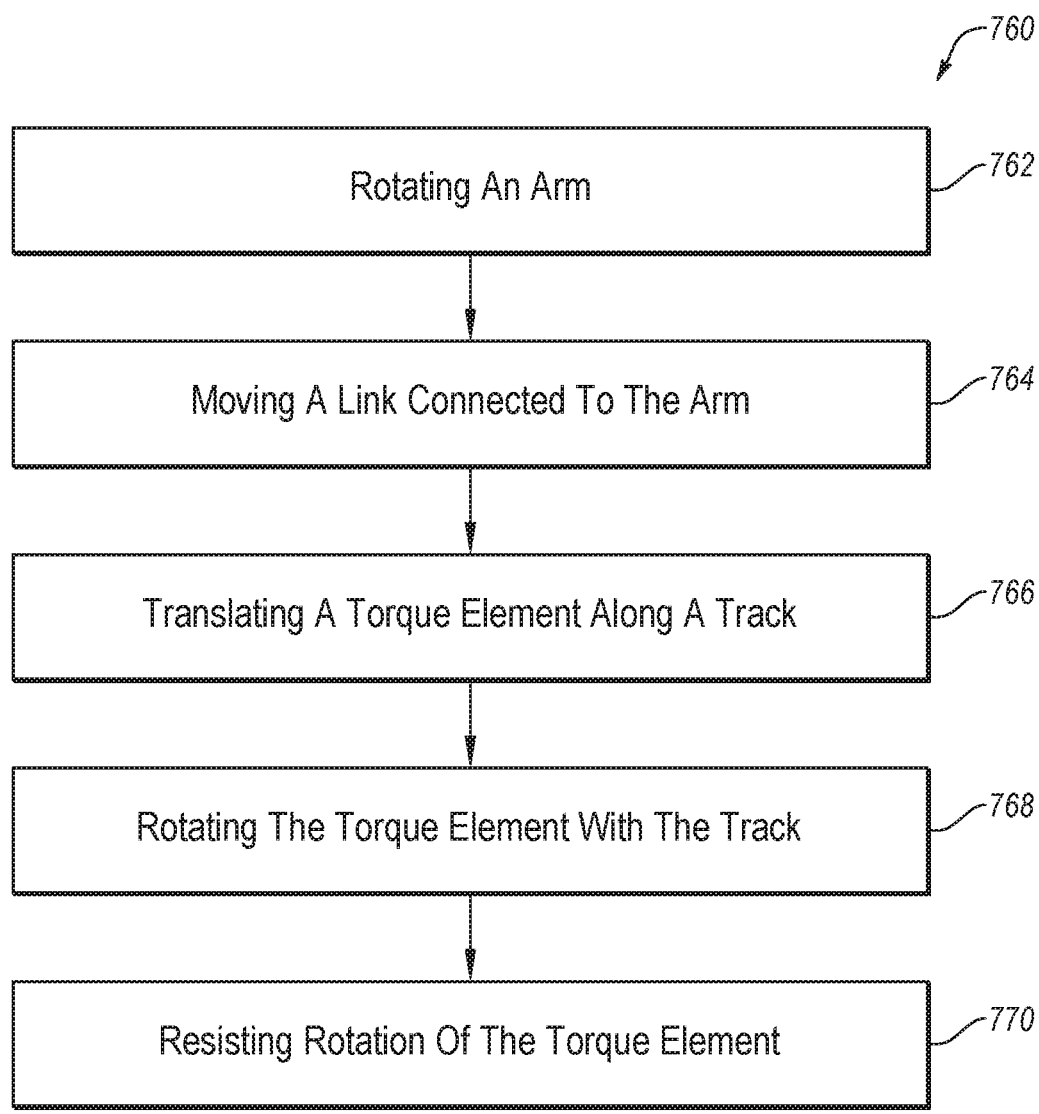
FIG. 8 is a flowchart illustrating an implementation of a method of supporting an electronic device.

FIG. 8 is a flowchart of an implementation of a method 760 of applying torque to a hinge, such as to support an electronic device. In some implementations, the method 760 may include rotating an arm 762 about a first lateral axis at 762 and moving a link connected to the arm at 764. The link may be connected to a torque element and a movement of the link may translate the torque element along a track in a longitudinal direction at 766. The torque element may be in contact with the track and, the translation of the torque element along the track may rotate the torque element about a second lateral axis at 768.

In some implementations, the track and the torque element may interact through interlocking features, such as teeth or other surface features. For example, the interlocking teeth may limit and/or prevent the longitudinal movement of the torque element relative to the track without rotation of the torque element. In other implementations, the track and the torque element may interact through friction. For example, a frictional force between the track and the torque element may limit and/or prevent the longitudinal movement of the torque element relative to the track without rotation of the torque element.

The method 860 may further include resisting the rotation of the torque element about the second lateral axis at 870. In some implementations, a first portion of the torque element may resist rotation relative to a second portion of the torque element. In other implementations, a friction portion of the torque element may be in contact with a portion of the track and may resist the rotation of the torque element relative to the track.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device for controlling movement of a support, the device comprising:
   a frame;
   an arm rotatably connected to the frame about a first lateral axis;
   a torque element displaced from the first lateral axis in a longitudinal direction perpendicular to the first lateral axis, the torque element being rotatable about a second lateral axis and configured to resist rotation about the second lateral axis while rotating about the second lateral axis; and
   a link connected to the arm and the torque element such that rotation of the arm about the first lateral axis translates the torque element in the longitudinal direction.

2. The device of claim 1, the torque element having a first portion and a second portion, one of the first portion and second portion being fixed relative to the link.

3. The device of claim 1, the torque element having a lateral width less than a lateral width of the arm.

4. The device of claim 1, the frame having a track and the torque element being positioned in the track such that longitudinal displacement of the torque element relative to the track rotates the torque element.

5. The device of claim 4, the track and friction element being a rack and pinion.

6. The device of claim 4, the frame having a plurality of tracks.

7. The device of claim 6, the torque element having a plurality of gears connected thereto.

8. The device of claim 4, the hinge comprising a plurality of torque elements having different rotational frictions.

9. The device of claim 4, the track being at least partially curved in a vertical direction.

10. The device of claim 1, the arm having an open position and a closed position, the arm and frame having a height of less than 4.0 millimeters in the closed position.

11. The device of claim 10, the arm and the frame forming at least a 165 degree angle in the open position.

12. A hinge, the hinge comprising:
    a frame;
    an arm rotatably connected to the frame about a first lateral axis; and
    a torque element having an axis of rotation at a second lateral axis that is parallel to and displaced from the first lateral axis, wherein the arm has an open position, an intermediate position, and a closed position and the torque element does more work when the arm moves between the open position and the intermediate position than between the intermediate position and the closed position.

13. The hinge of claim 12, the torque element remaining stationary about the second lateral axis in up to 5 degrees of rotation of the arm about the first lateral axis adjacent the closed position.

14. The hinge of claim 12, the torque element rotating about the second lateral axis a greater amount than the arm rotates about the first lateral axis while moving the arm from the closed position to the open position.

15. The hinge of claim 12, the torque element providing increasing resistance to the arm the near the open position than near the closed position.

16. The hinge of claim 12, a torque curve of the hinge being continuous.

17. A method of applying torque in a hinge, the method comprising:
   rotating an arm about a first lateral axis;
   moving a link connected to the arm;
   translating a torque element in a longitudinal direction along a track;
   rotating the torque element about a second lateral axis by an interaction of the torque element and the track; and
   resisting the rotation of the torque element about the second lateral axis while rotating the torque element about the second lateral axis.

18. The method of claim 17, wherein rotating the arm about the first lateral axis through 165 degrees causes the torque element to rotate through greater than 165 degrees.

19. The method of claim 17, wherein a rotational rate of the arm is not constant relative to a torque element rotational rate.

* * * * *